US006170802B1

(12) United States Patent
Stovall

(10) Patent No.: US 6,170,802 B1
(45) Date of Patent: Jan. 9, 2001

(54) CONVERTIBLE LIFTING DEVICE

(76) Inventor: Lonnie Thomas Stovall, 20121 Arrowood St., Burney, CA (US) 96013

( * ) Notice: Under 35 U.S.C. 154(b), the term of this patent shall be extended for 0 days.

(21) Appl. No.: 09/397,602

(22) Filed: Sep. 16, 1999

(51) Int. Cl.[7] ..... B60P 1/48
(52) U.S. Cl. ..... 254/8 B
(58) Field of Search ..... 254/8 B, 8 R, 254/2 B, 2 R, 4 B, 4 R, 124; 269/17

(56) References Cited

U.S. PATENT DOCUMENTS 5,261,640 * 11/1993 Yuan ..... 254/8 B

FOREIGN PATENT DOCUMENTS

2003769 * 11/1970 (DE) ..... 254/8 R

* cited by examiner

*Primary Examiner*—Robert C. Watson
(74) *Attorney, Agent, or Firm*—Goldstein & Canino

(57) ABSTRACT

A convertible lifting device including a base. A vertical stanchion is coupled with respect to the base. A horizontal stanchion is pivotally coupled with respect to the vertical stanchion. The horizontal stanchion includes a hook disposed on an outer end thereof. A hydraulic ram is coupled between the vertical stanchion and the horizontal stanchion. A hydraulic pump is coupled with the vertical stanchion in communication with the hydraulic ram. The pump has a handle coupled thereto to facilitate raising and lowering of the hydraulic ram so as to pivot the horizontal stanchion with respect to the vertical stanchion.

7 Claims, 2 Drawing Sheets

CONVERTIBLE LIFTING DEVICE

BACKGROUND OF THE INVENTION

The present invention relates to a convertible lifting device and more particularly pertains to enabling heavy objects to be picked up and moved from one place to another.

Those who work on automobiles sometimes find it necessary to remove the engine from the vehicle. Unfortunately, these engines are extremely heavy and generally require some type of machinery in order to accomplish this task. The machinery used is often complicated and difficult to use and tends take up a significant amount of space. These machines sometimes require more than one person to successfully negotiate the removal of the engine. What is needed is a device that will allow one person to remove an engine from a vehicle and transport the engine to another location if needed. The device could also easily be used to pick up other heavy objects.

The present invention attempts to solve the abovementioned problem by providing a device that is portable and convertible, and can be simply operated by a single person in order to facilitate the removal of an engine from a vehicle or, in the alternative, move some other heavy object.

The use of lifting devices are known in the prior art. More specifically, lifting devices heretofore devised and utilized for the purpose of lifting heavy items are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,725,112 to Thorby discloses a portable crane for use in conjunction with a motor vehicle comprised of a lifting arm, hook, and telescopic brace. U.S. Pat. No. 5,402,898 to Lute discloses a crane assembly with a turnable attachment for use with a vehicle. U.S. Pat. No. 5,211,297 to Vandervalk discloses a mobile, folding crane. U.S. Pat. No. 4,483,448 to Wittman discloses a heavy duty crane.

While these devices fulfill their respective, particular objective and requirements, the aforementioned patents do not describe a convertible lifting device for enabling heavy objects to be picked up and moved from one place to another.

In this respect, the convertible lifting device according to the present invention substantially departs from the conventional concepts and designs of the prior art, and in doing so provides an apparatus primarily developed for the purpose of enabling heavy objects to be picked up and moved from one place to another.

Therefore, it can be appreciated that there exists a continuing need for a new and improved convertible lifting device which can be used for enabling heavy objects to be picked up and moved from one place to another. In this regard, the present invention substantially fulfills this need.

SUMMARY OF THE INVENTION

In the view of the foregoing disadvantages inherent in the known types of lifting devices now present in the prior art, the present invention provides an improved convertible lifting device. As such, the general purpose of the present invention, which will be described subsequently in greater detail, is to provide a new and improved convertible lifting device and method which has all the advantages of the prior art and none of the disadvantages.

To attain this, the present invention essentially comprises a base comprised of a pair of elongated bars with wheels on opposing ends thereof. A pair of cross plates extend between the elongated bars adjacent one end of the base. The pair of cross plates have a receiving collar secured thereto. The collar has an open forward end directed forwardly with respect to the base. The collar has an aperture through a side wall thereof for removably receiving a locking pin therein. A vertical stanchion is coupled with respect to the base. The vertical stanchion includes a lower portion and an upper portion. The lower portion has an L-shaped support secured to a lower end thereof. The L-shaped support has a horizontal portion dimensioned for being received within the open forward end of the receiving collar of the base. The horizontal portion has an aperture therethrough for aligning with the aperture in the receiving collar for receiving a locking pin therethrough. An open upper end of the lower portion telescopically receives the upper portion therein. The lower portion has a gear disposed therein for engaging threads formed on the upper portion. The gear is connected with a crank whereby rotation of the crank will rotate the gear so as to selectively raise and lower the upper portion with respect to the lower portion. A horizontal stanchion is pivotally coupled with respect to the vertical stanchion. The horizontal stanchion includes an inner portion and an outer portion. The inner portion is pivotally coupled with an upper end of the upper portion of the vertical stanchion. The inner portion has an open outer end for slidably receiving the outer portion therein. The inner portion and the outer portion have a plurality of apertures therethrough for selectively aligning for receiving a locking pin therethrough so as to fix the outer portion with respect to the inner portion. An outer end of the outer portion has a hook coupled thereto. A hydraulic ram is coupled between the vertical stanchion and the horizontal stanchion. The ram has a lower end pivotally secured to the upper portion of the vertical stanchion. An upper end of the ram is couplable to one of a plurality of tabs secured to the inner portion of the horizontal stanchion. A hydraulic pump is coupled with the vertical stanchion in communication with the hydraulic ram. The pump has a handle coupled thereto to facilitate raising and lowering of the hydraulic ram.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved convertible lifting device which has all the advantages of the prior art lifting devices and none of the disadvantages.

It is another object of the present invention to provide a new and improved convertible lifting device which may be easily and efficiently manufactured and marketed.

It is a further object of the present invention to provide a new and improved convertible lifting device which is of durable and reliable construction.

An even further object of the present invention is to provide a new and improved convertible lifting device which is susceptible of a low cost of manufacture with regard to both materials and labor, and which accordingly is then susceptible of low prices of sale to the consuming public, thereby making such a convertible lifting device economically available to the buying public.

Even still another object of the present invention is to provide a new and improved convertible lifting device for enabling heavy objects to be picked up and moved from one place to another.

Lastly, it is an object of the present invention to provide a new and improved convertible lifting device including a base. A vertical stanchion is coupled with respect to the base. A horizontal stanchion is pivotally coupled with respect to the vertical stanchion. The horizontal stanchion includes a hook disposed on an outer end thereof. A hydraulic ram is coupled between the vertical stanchion and the horizontal stanchion. A hydraulic pump is coupled with the vertical stanchion in communication with the hydraulic ram. The pump has a handle coupled thereto to facilitate raising and lowering of the hydraulic ram.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
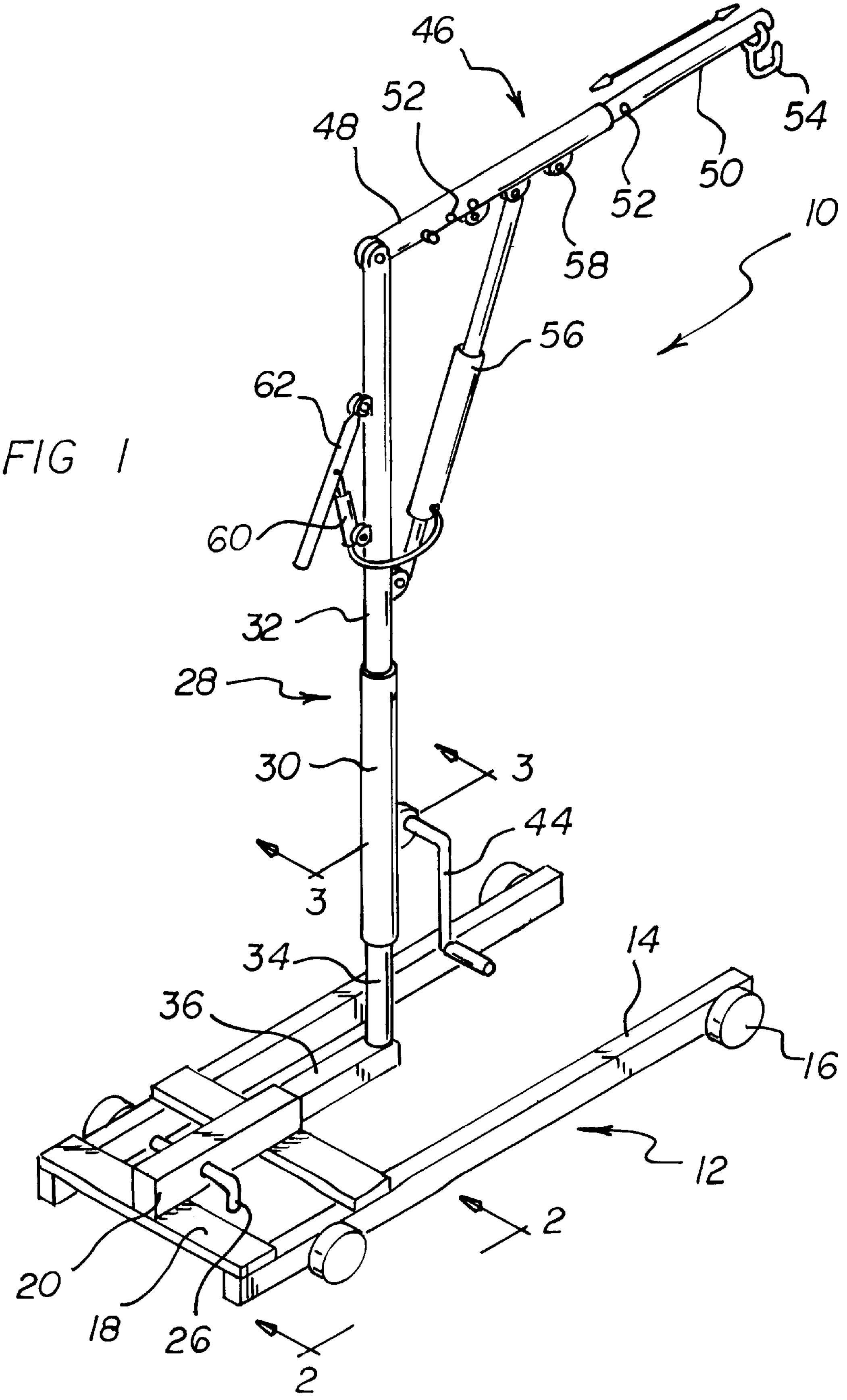
FIG. 1 is a perspective view of the preferred embodiment of the convertible lifting device constructed in accordance with the principles of the present invention.
Figure 2:
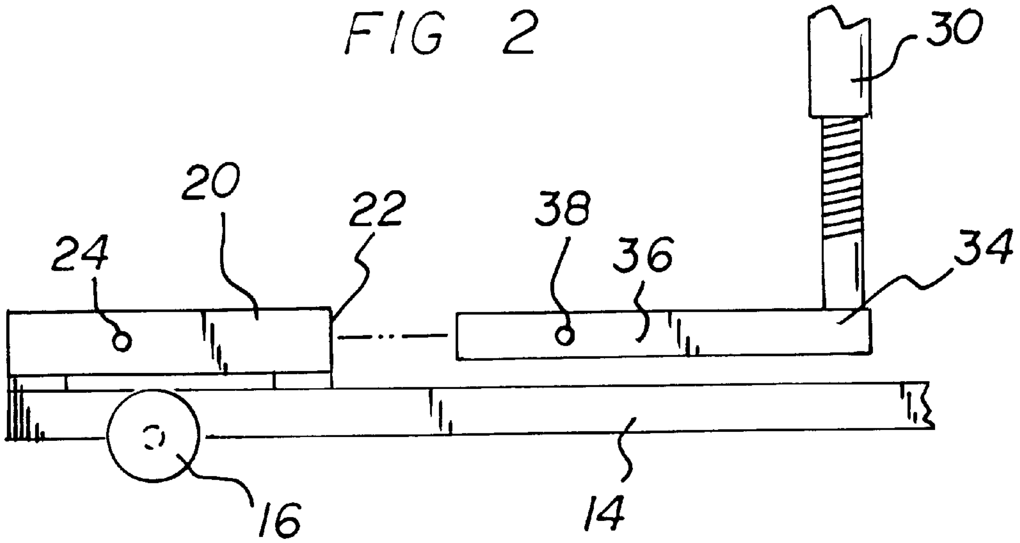
FIG. 2 is a side view of the present invention as taken along line 2—2 of FIG. 1.
Figure 3:
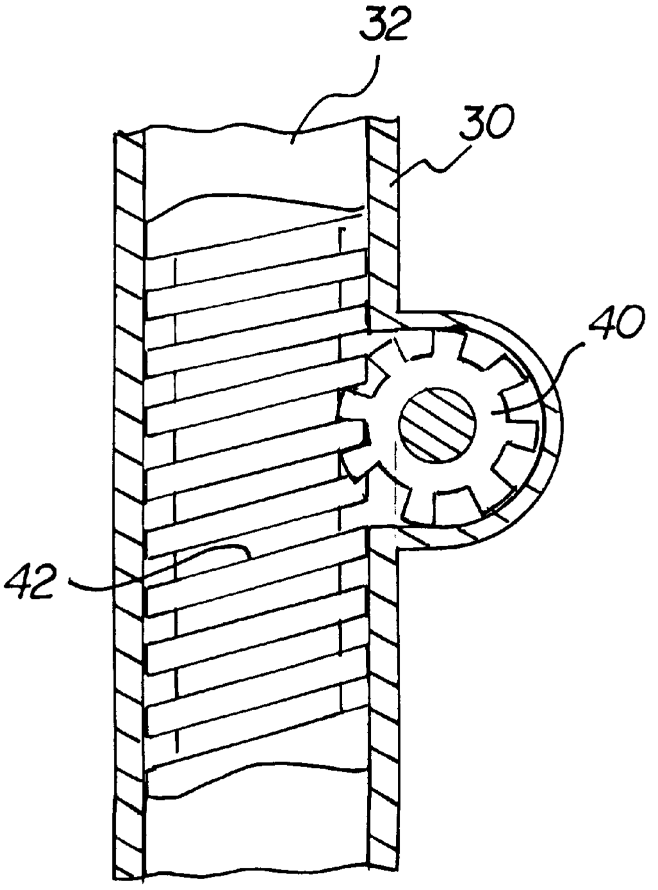
FIG. 3 is a cross-sectional view of the present invention as taken along line 3—3 of FIG. 1.

With reference now to the drawings, and in particular, to FIGS. 1 through 3 thereof, the preferred embodiment of the new and improved convertible lifting device embodying the principles and concepts of the present invention and generally designated by the reference number 10 will be described.

Specifically, it will be noted in the various Figures that the device relates to a convertible lifting device for enabling heavy objects to be picked up and moved from one place to another. In its broadest context, the device consists of a base, a vertical stanchion, a horizontal stanchion, a hydraulic ram, and a hydraulic pump. Such components are individually configured and correlated with respect to each other so as to attain the desired objective.

The base 12 is comprised of a pair of elongated bars 14 with wheels 16 on opposing ends thereof. A pair of cross plates 18 extend between the elongated bars 14 adjacent one end of the base 12. The pair of cross plates 18 have a receiving collar 20 secured thereto. The collar 20 has an open forward end 22 directed forwardly with respect to the base 12. The collar 20 has an aperture 24 through a side wall thereof for removably receiving a locking pin 26 therein.

The vertical stanchion 28 is coupled with respect to the base 12. The vertical stanchion 28 includes a lower portion 30 and an upper portion 32. The lower portion 30 has an L-shaped support 34 secured to a lower end thereof. The L-shaped support 34 has a horizontal portion 36 dimensioned for being received within the open forward end 22 of the receiving collar 20 of the base 12. The horizontal portion 36 has an aperture 38 therethrough for aligning with the aperture 24 in the receiving collar 20 for receiving a locking pin 24 therethrough. Note FIG. 2. An open upper end of the lower portion 30 telescopically receives the upper portion 32 therein. The lower portion 30 has a gear 40 disposed therein for engaging threads 42 formed on the upper portion 32. The gear 40 is connected with a crank 44 whereby rotation of the crank 44 will rotate the gear 40 so as to selectively raise and lower the upper portion 32 with respect to the lower portion 30.

The horizontal stanchion 46 is pivotally coupled with respect to the vertical stanchion 28. Note FIG. 1. The horizontal stanchion 46 includes an inner portion 48 and an outer portion 50. The inner portion 48 is pivotally coupled with an upper end of the upper portion 32 of the vertical stanchion 28. The inner portion 48 has an open outer end for slidably receiving the outer portion 50 therein. The inner portion 48 and the outer portion 50 have a plurality of apertures 52 therethrough for selectively aligning for receiving a locking pin therethrough so as to fix the outer portion 50 with respect to the inner portion 48. An outer end of the outer portion 50 has a hook 54 coupled thereto. The hook 54 will be used to connect directly to a heavy object or, in the alternative, connect to a chain or the like that is secured around the heavy object that facilitates the lifting.

The hydraulic ram 56 is coupled between the vertical stanchion 28 and the horizontal stanchion 46. The ram 56 has a lower end pivotally secured to the upper portion 32 of the vertical stanchion 28. An upper end of the ram 56 is couplable to one of a plurality of tabs 58 secured to the inner portion 48 of the horizontal stanchion 46.

The hydraulic pump 60 is coupled with the vertical stanchion 28 in communication with the hydraulic ram 60. The pump 60 has a handle 62 coupled thereto to facilitate raising and lowering of the hydraulic ram 56. By pumping the handle 62, the hydraulic pump 60 will cause the ram 56 to extend or, in the alternative, lower, whereby the heavy object that is secured to the device 10 via the hook 54 can be moved.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A convertible lifting device for enabling heavy objects to be picked up and moved from one place to another comprising, in combination:

a base comprised of a pair of elongated bars with wheels on opposing ends thereof, a pair of cross plates extending between the elongated bars adjacent one end of the base, the pair of cross plates having a receiving collar secured thereto, the collar having an open forward end directed forwardly with respect to the base, the collar having an aperture through a side wall thereof for removably receiving a locking pin therein;

a vertical stanchion coupled with respect to the base, the vertical stanchion including a lower portion and an upper portion, the lower portion having an L-shaped support secured to a lower end thereof, the L-shaped support having a horizontal portion dimensioned for being received within the open forward end of the receiving collar of the base, the horizontal portion having an aperture therethrough for aligning with the aperture in the receiving collar for receiving a locking pin therethrough, an open upper end of the lower portion telescopically receiving the upper portion therein, the lower portion having a gear disposed therein for engaging threads formed on the upper portion, the gear being connected with a crank whereby rotation of the crank will rotate the gear so as to selectively raise and lower the upper portion with respect to the lower portion;

a horizontal stanchion pivotally coupled with respect to the vertical stanchion, the horizontal stanchion including an inner portion and an outer portion, the inner portion being pivotally coupled with an upper end of the upper portion of the vertical stanchion, the inner portion having an open outer end for slidably receiving the outer portion therein, the inner portion and the outer portion having a plurality of apertures therethrough for selectively aligning for receiving a locking pin therethrough so as to fix the outer portion with respect to the inner portion, an outer end of the outer portion having a hook coupled thereto;

a hydraulic ram coupled between the vertical stanchion and the horizontal stanchion, the ram having a lower end pivotally secured to the upper portion of the vertical stanchion, an upper end of the ram being couplable to one of a plurality of tabs secured to the inner portion of the horizontal stanchion;

a hydraulic pump coupled with the vertical stanchion in communication with the hydraulic ram, the pump having a handle coupled thereto to facilitate raising and lowering of the hydraulic ram.

2. A convertible lifting device for enabling heavy objects to be picked up and moved from one place to another comprising, in combination:

a base comprised of a pair of elongated bars with wheels on opposing ends thereof, a pair of cross plates extending between the elongated bars adjacent to one end of the base, the pair of cross plates having a receiving collar secured thereto, the collar having an open forward end directed forwardly with respect to the base, the collar having an aperture through a side wall thereof for removably receiving a locking pin therein;

a vertical stanchion coupled with respect to the base;

a horizontal stanchion pivotally coupled with respect to the vertical stanchion, the horizontal stanchion having a hook disposed on an outer end thereof;

a hydraulic ram coupled between the vertical stanchion and the horizontal stanchion;

a hydraulic pump coupled with the vertical stanchion in communication with the hydraulic ram, the pump having a handle coupled thereto to facilitate raising and lowering of the hydraulic ram.

3. The convertible lifting device as set forth in claim 2 wherein the vertical stanchion includes a lower portion and an upper portion, the lower portion having an L-shaped support secured to a lower end thereof, the L-shaped support having a horizontal portion dimensioned for being received within the open forward end of the receiving collar of the base, the horizontal portion having an aperture therethrough for aligning with the aperture in the receiving collar for receiving a locking pin therethrough.

4. The convertible lifting device as set forth in claim 3 wherein an open upper end of the lower portion telescopically receives the upper portion therein, the lower portion having a gear disposed therein for engaging threads formed on the upper portion, the gear being connected with a crank whereby rotation of the crank will rotate the gear so as to selectively raise and lower the upper portion with respect to the lower portion.

5. The convertible lifting device as set forth in claim 4 wherein the horizontal stanchion includes an inner portion and an outer portion, the inner portion being pivotally coupled with an upper end of the upper portion of the vertical stanchion, the inner portion having an open outer end for slidably receiving the outer portion therein.

6. The convertible lifting device as set forth in claim 5 wherein the inner portion and the outer portion have a plurality of apertures therethrough for selectively aligning for receiving a locking pin therethrough so as to fix the outer portion with respect to the inner portion.

7. The convertible lifting device as set forth in claim 6 wherein the ram has a lower end pivotally secured to the upper portion of the vertical stanchion, an upper end of the ram being couplable to one of a plurality of tabs secured to the inner portion of the horizontal stanchion.

* * * * *